United States Patent [19]

Lee

[11] Patent Number: 5,004,175

[45] Date of Patent: Apr. 2, 1991

[54] WINDING CORE FOR MAGNETIC TAPE ADAPTED FOR STACKING

[75] Inventor: Jaeduck Lee, Inchon, Rep. of Korea

[73] Assignee: Saehan Media Corporation, Rep. of Korea

[21] Appl. No.: 391,429

[22] Filed: Aug. 9, 1989

[30] Foreign Application Priority Data

Mar. 28, 1989 [KR] Rep. of Korea .................. 3463[U]

[51] Int. Cl.⁵ ............................................. B65H 75/18
[52] U.S. Cl. .................................................. 242/68.5
[58] Field of Search .................... 242/68.5, 71.8, 68.6; 206/394, 503, 509

[56] References Cited

U.S. PATENT DOCUMENTS

| 4,081,151 | 3/1978 | Ender et al. | 242/68.5 |
| 4,201,353 | 5/1980 | Schor et al. | 242/68.5 |
| 4,280,670 | 7/1981 | Schor et al. | 242/68.5 |
| 4,341,357 | 7/1982 | DeFilipo et al. | 242/68.5 |

*Primary Examiner*—John M. Jillions

[57] ABSTRACT

A flangless winding core for magnetic tape is adapted for stacking between like winding cores. The core has an annular body with top and bottom annular body surfaces, an outer circumferential surface to wind the tape thereabout, and an inner circumferential surface from which each of a plurality of equidistant projections with high and low circular extensions extends in the outward directions of the top and bottom annular body surfaces and a like plurality of recesses with two circular notches in the both edges thereof and corresponding to the high and low circular extensions are arranged in a space adjacent to the projections, so that the recesses can be consequently corresponded to the projections at the time of stacking the cores. The projections are inserted and interlocked with the opposite recesses when stacking the cores, so that they can prevent the cores from being shaken by exterior power from the circumferential direction, and the extensions on the projections and the notches on the recesses increase facing area for firm interlocking of the cores, and the notches give spaces for driving pins to be inserted when the cores are mounted on the processing equipments such as cutting machines or rewinders.

1 Claim, 3 Drawing Sheets

WINDING CORE FOR MAGNETIC TAPE ADAPTED FOR STACKING

BACKGROUND OF THE INVENTION

The present invention relates to flangeless winding cores for magnetic tape, adapted for stacking with their surfaces in contact and the tapes wound thereabout in supporting contact.

The recording of sound on magnetic tape and the packaging and marketing of such tape recordings has become a large-scale industry incorporating many mass production techniques. Standardized winding cores used in transporting the tapes and handling the tapes during processing are generally adapted to take advantage of such techniques.

Two factors are of particular importance with respect to such techniques. First, the capability to stack such cores with tape wound therearound, but without intervening support material between the tape on adjacent cores, permits increased efficiency in transporting and handling the cores and tape. Secondly, the expensive and sophisticated machinery utilized in processing the tape in large part is adapted to employ holding devices for the cores which create a significant design requirement. Briefly, to accomodate stacking efficiency, the core should generally have a height approximately equal to the width of the tape wound therearound. On the other hand, to accomodate processing with the existing expensive machinery, a greater height than the width of many of the tape sizes, is required.

Ender et al, U.S. Pat. No. 4,081,151 addresses these somewhat contradictory requirements by providing deformations which alternately rises on opposite (top and bottom) sides of a core. These deformations take a rather complex shape permitting interlocking of a deformation rising from the top side of a lower core with the recessed underside of a deformation rising from the top side of an upper core. The height of such cores, apart from the projections, may then generally be about the same as the width of the tape. With respect to such height, Ender discloses projections extending about one half of that height beyond the part of the core having the height; however, cores along the lines of that in Ender, have been employed with projections larger than this ratio. Concerning another aspect, spindle indentations normally required in the winding cores, as a result of the other aspects of the design in Ender, are located along the deformations, and follow an alternating pattern resulting from the alternating pattern of the deformation.

In another embodiment, Ender discloses a winding core with a bead-like ridge valley configuration along the top and bottom of the core; and indentations along a ridge are provided to receive pins projecting from a mating valley to prevent relative rotation of adjacent cores. This embodiment has the disadvantage, however, that the core can only be stacked one way up; that is, the elevated side of one core of the stack must always be placed in the recessed surface of the other.

The problem of satisfying and processing requirements for tape winding cores is also addressed in Schor U.S. Pat. Nos. 4,201,353 and 4,280,670, by providing an annular body having an outer circumferential surface on which the tape is wound and a center hole around which a multiplicity of recesses are uniformly distributed. A set of six opposed projections extend upwardly and downwardly from the top and bottom surfaces of the annular body, the projections being arranged in a circular array adjacent the center hole and spaced for mating with every third recess along the array of recesses of a sandwiching core. In the disclosed embodiment, the projectionms rise 2.46 mm (0.097") above the level of the top and bottom surfaces which, when added to a body thickness of 3.96 mm (0.156") gives a total height of 8.88 mm, substantially equal to the 9.9 mm (0.350") standard. In spite of its meeting this aspect of the standard, the commercial version of the Schor winding core tends to slip on the driving hub of existing processing machinery, probably because the overall height of the projections is 0.312", not 0.350" disclosed in the patent, and thus not sufficient adquately to engage the hub.

Furthermore, a flangeless winding core for magnetic tape adapted for stacking between like winding cores is addressed in Filippo U.S. Pat. No. 4,341,357, by providing an annular body with parallel top and bottom annular surfaces, an outer circumferential surface around which the tape is wound, and an inner circumferential surface from which a plurality of angularly spaced lugs extend radially inward, the inner ends of which are curved to define a discontinuous inner circumferential core surface. The lugs have the shape of a sector of an annulus, are spaced from each other by a like number of similarly shaped gaps, and project equally above the top and bottom surfaces of the annular body a distance greater than one-half the axial dimension of the annular body. The top and bottom surfaces of the lugs are parallel to each other and slope relative to the median plane of the annular body, thereby to maximize the effective axial length of the discontinuous inner circumferential core surface while permitting stacking of the annular body surfaces against one another, with the lugs mating with the gaps of a nesting core, and enabling a tape having a width approximately the same as the axial dimension of the outer circumferential surface to support the tape wound about an adjacent core when the cores are stacked.

SUMMARY OF THE INVENTION

The present invention satisfies the stacking and processing requirements for winding cores used in a mass production environment with a significantly simpler and less expensive structure than known cores of this type. This is achieved by providing recesses for a spindle along the core, for mating with projections of an adjacent core in a stack of such cores.

In accordance with the invention, a winding core for magnetic tape, adapted for stacking either side up between like first and second nesting cores, includes: an annular body with parallel top and bottom surfaces, an outer circumferential surface for winding the tape therearound, an inner circumferential surface from which each of a plurality of equidistant projections with high and low circular extensions extends in the outward directions of the top and bottom annular body surfaces, the projections being circumferentially spaced apart by a like plurality of recesses with circular notches in the both edges thereof generally corresponding in shape and dimensions to that of the projections.

BRIEF DESCRIPTION OF THE DRAWINGS

Other objects, features and advantages of the invention will become apprarent, and its construction and operation better understood, from the following detailed description, taken in conjunction with the accompanying drawings, in which.

DESCRIPTION OF THE PREFERRED EMBODIMENT

Figure 1:
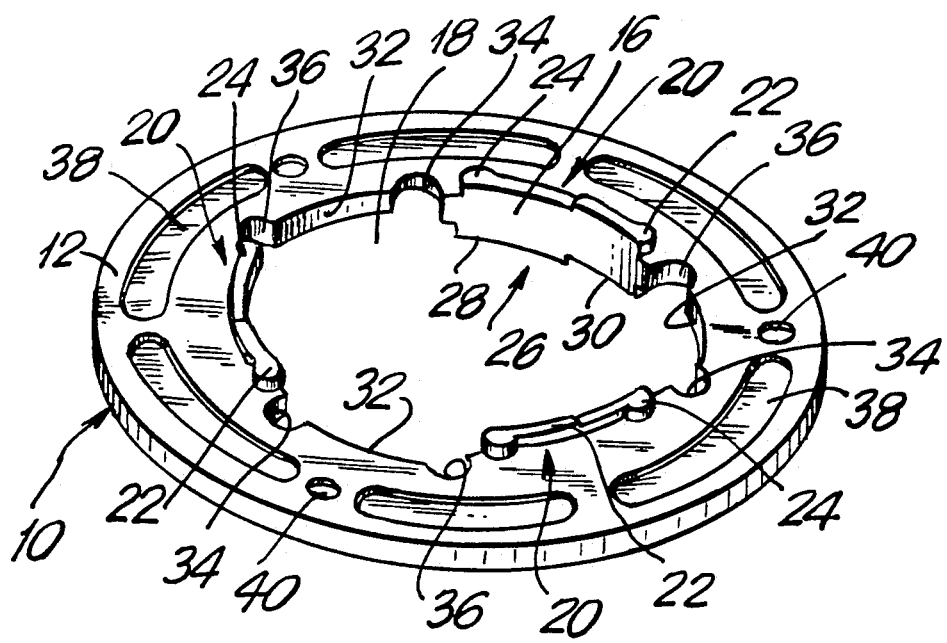
FIG. 1 is a perspective view of a tape winding core in accordance with the invention.

Referring to FIG. 1, a winding core 10 in accordance with the invention has a substantially annular body 12 having an outer circumferential surface 14 and an inner circumferential surface 16, and a center hole 18.

About the outer circumferential surface 14, a magnetic tape is typically wound. The inner circumferential surface 16 has a set of three projections 20 with high and low circular extensions 22 and 24 from a top of the annular body 12 and another set of three projections 26 with high and low circular extensions 28 and 30 from the bottom, and set of three recesses 32 with circular notches 34 and 36 in the both edges thereof generally corresponding in shape and dimensions to the projections 20 or 26. Making the recesses slightly larger than the projections facilitates insertion therein of the projections of adjacent stacked cores. The bottom surface (not shown) is, as would be expected, the mirror image of the top surface. To conserve material, a plurality of oval grooves 38, that is, six in the illustrated exemplary embodiment, are provided on the top and bottom sides of the annular body 12 and, to strenthen the annular body, a plurality of strengthening points 40, that is, three in the illustrated exemplary embodiment, are provided on the top and bottom sides thereof.

The circular extensions 22 and 24 may be provided on one of oval, circular, quadrangular and lozenged shapes, etc., so that a point of contact between the projections at the time of stacking may be broadened as soon as possible. Also a number of the notches 6a and and 6b may be used for receiving the driving pins of the holding devices.

Figure 2:
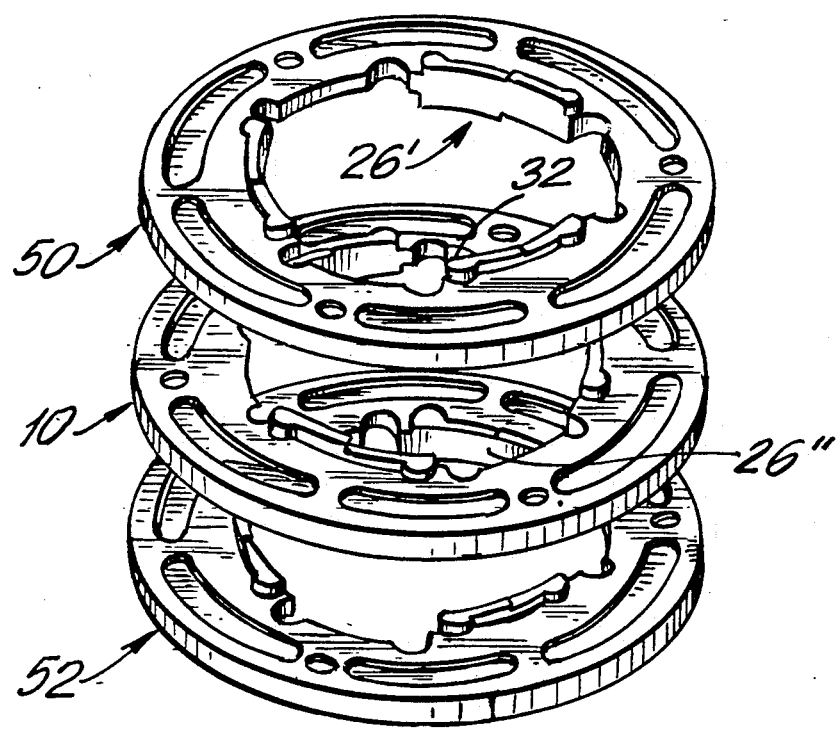
FIG. 2 is an exploded perspective view of three of the winding cores shown in stacked relationship.
Figure 3:
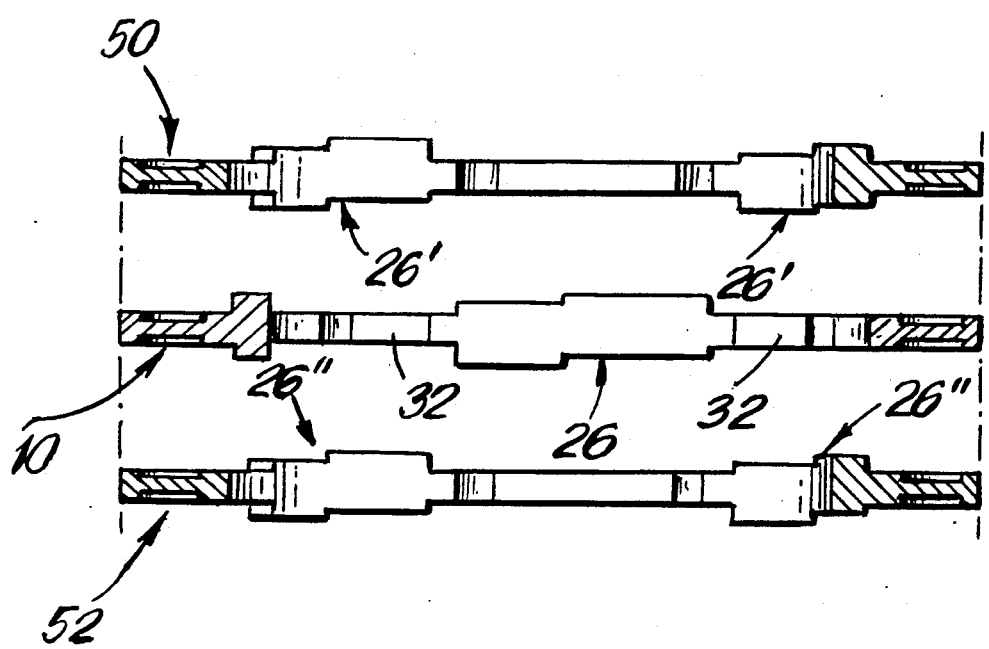
FIG. 3 is a broken-way, exploded cross sectional view of three of the winding cores of the type shown in FIG. 1 in stacked relation.

Referring to FIGS. 2 and 3, the winding core 10 of FIG. 1 is shown sandwiched(exploded from such sandwiching in FIG. 2) between an identical upper nesting core 50 and an identical lower core 52. It will be evident from FIG. 2 that each of the projection is adapted for mating with any of the recesses of an adjacent core. This kind of mating interaction facilitates the nesting of cores in that a relative rotation between adjacent cores of no more than about 60 degrees is required to effect mating of the projections of one core with the recesses of an adjacent core. For example, the bottom projections 26' of the core 50 nests into the recess 32 of the core 10 and the top projection 26" of the core 52 nests into the recess 32 of the core 10, as shown in FIG. 2. In other words, the bottom projections of the upper core 50 nest into the recesses of the core 10 and the top projections of the lower core 52 nest into the recesses of the core 10, allowing both projections to be received within a recess of the sandwiched core 10, with their mating surfaces fully contacting each other, while at the same time allowing the annular surfaces of the sandwiched core to contact adjacent surfaces of the sandwiching cores, as shown in FIG. 3.

The above stacking structure facilitates the locking of a core with an adjacent core and enhances the capability of the stacked cores to withstand forces which might tend to rotate the cores relative to one another. Furthermore, the projections with high and low circular extensions may be used for a guide post describing a direction for the tape to be wound around the core, because of different heights of the projections.

It will be appreciated that many changes and modifications in the described embodiment may be without departing form the scope and spirit of the invention.

What is claimed is:

1. A winding core for magnetic tape, adapted to be sandwiched between a first like upper and a second like lower sandwiching core for stacking, comprising:

an annular body having top and bottom substantially annular body surfaces, an outer circumferential body surface for winding therearound and an inner circumferential surface, a plurality of projections equidistantly located around said inner circumferential surface and extending in outward directions from said top and bottom annular body surfaces, said projections each having first and second circular extensions, the first circular extension being higher than the second circular extension, and a corresponding plurality of recesses in said inner circumferential surface having circular notches in opposite edges thereof, said recesses and notches and said projections and circular extensions being of a shape and dimension such that when the winding core is stacked between the first like upper core and the second like lower core, the projections and circular extensions from the bottom surface of the first upper core mate with corresponding recesses and notches of the winding core which is being sandwiched and the projections and circular extensions from the top surface of the second lower core mate with corresponding recesses and notches of the winding core which is being sandwiched and the higher and lower circular extensions from the bottom surface of the first upper core engage with corresponding lower and higher circular extensions from the top surface of the second lower core respectively.

* * * * *